United States Patent [19]

Turunen

[11] Patent Number: 5,473,295

[45] Date of Patent: Dec. 5, 1995

[54] SAW NOTCH FILTER FOR IMPROVING STOP-BAND ATTENUATION OF A DUPLEX FILTER

[75] Inventor: Aimo Turunen, Oulu, Finland

[73] Assignee: LK-Products Oy, Kempele, Finland

[21] Appl. No.: 956,501

[22] Filed: Jan. 6, 1993

[30] Foreign Application Priority Data

Jul. 6, 1990 [FI] Finland .................................. 903453

[51] Int. Cl.[6] .......................... H01P 1/213; H03H 11/34
[52] U.S. Cl. .................... 333/132; 333/133; 333/193; 333/202; 370/38; 370/123
[58] Field of Search .................................... 333/126, 129, 333/132–134, 193, 202; 370/38, 123

[56] References Cited

U.S. PATENT DOCUMENTS

| | | | |
|---|---|---|---|
| 4,509,165 | 4/1985 | Tamura | 370/38 |
| 4,910,481 | 3/1990 | Sasaki et al. | 333/134 |
| 5,254,962 | 10/1993 | Morris et al. | 333/193 |

FOREIGN PATENT DOCUMENTS

| | | | |
|---|---|---|---|
| 128245 | 10/1979 | Japan | 333/132 |
| 211701 | 8/1990 | Japan | 333/133 |

*Primary Examiner*—Benny Lee
*Attorney, Agent, or Firm*—Darby & Darby

[57] ABSTRACT

When the bandwidth of a duplex filter having a certain band-width, intended for a radio telephone, is increased by affecting the coupling between the resonator circuits, the stop band of the filter is at the same time deteriorated. According to the invention, the stop-band attenuation can be improved by coupling a surface-wave filter, coupled as a notch circuit, in parallel with one of the resonator circuits of the duplex filter.

6 Claims, 1 Drawing Sheet

SAW NOTCH FILTER FOR IMPROVING STOP-BAND ATTENUATION OF A DUPLEX FILTER

The present invention relates to a system by which the stop-band attenuation of a duplex filter having a certain band-width can be improved when the bandwidth is increased by affecting the coupling between the resonator circuits.

BACKGROUND OF THE INVENTION

It is known that resonator-based duplex filters are used in a radio telephone to prevent the sensing of a transmitted signal by the receiver and the sensing of a received signal by the transmitter. The filter has a precisely defined stop band and pass band for each purpose. Since the price of the duplex filters of radio telephones is affected, in addition to other factors, by the number of filters manufactured, this in practice means that a separate construction is not designed for each individual duplex filter version intended for a different radio telephone network; instead, the same construction is used in different versions. However, in different versions the requirements vary, for example with respect to the widths of the stop bands and the pass bands, and thus the basic filter must be modified according to the requirements laid out in the specifications for the particular radio telephone network in use; In this case the basic construction should be applicable also to bandwidths greater than the bandwidths which were the basis for the original electrical design.

In practice the problem is to increase the bandwidth by using the same already existing mechanical construction and without changing the number of resonators. Often the desired new bandwidth is obtained simply by increasing the coupling between the resonator circuits in the duplex filter by some known mechanical method, in which case the number of resonators is thus not increased; it is possible to use as such the original duplex filter construction made up of resonators.

The disadvantage of this bandwidth-increasing prior art technique is that, while the inter-resonator coupling is modified and the bandwidth of the filter is thereby increased, the stop-band attenuation is at the same time reduced. This occurs immediately, without a delay. Sometimes the deteriorated stop-band attenuation can be tolerated, if it still fits the desired requirements, but usually in practice there arises a situation in which excessive deterioration of the stop band will prevent a necessary increasing of the bandwidth with the same mechanical construction.

In radio telephone technology, filters based on surface wave resonators have already been used for some time. They are also called SAW filters (surface acoustic wave filter). They have the advantage not only of a small size but also of precise reproducibility in manufacture. The basic part of a component utilizing the surface wave phenomenon is an interdigital transformer, which is made up of interdigital electrodes in a comb-like arrangement on the surface of a piezoelectric substrate. The inter-electrode electric voltage generates in the substrate acoustic waves which propagate on its surface in a direction which is perpendicular to the interdigital comb electrodes. These surface waves can be received by the interdigital transformer, which reconverts the surface acoustic waves propagating on the substrate surface to an electric voltage signal. As compared with an electromagnetic wave, the propagation speed of a surface acoustic wave on the surface of a piezoelectric substrate is about 1/100,000 times slower. By the surface wave technique it is possible to manufacture many circuits, such as filters, delay lines, resonators, oscillators, etc. One example is the notch filter described in U.S. Pat. No. 4,694,266. Filters using surface wave resonators have also been used in duplex filters, for example in U.S. Pat. No. 4,509,165; a combination technique is used in the filter described in this patent, the front end of the duplex filter, as seen from the antenna, being implemented using dielectric filters and the receiver-side part being implemented using surface wave filters.

SUMMARY OF THE INVENTION

The present invention discloses a method by which the stop band deterioration described earlier can be prevented. The method according to the invention makes it possible to use the same mechanical filter construction at bandwidths greater than those for which they were originally designed. The invention is characterized in that a surface wave filter coupled as a notch circuit is coupled in parallel with one of the resonator circuits of the duplex filter.

The invention is based on the idea that, when the band of an existing duplex filter is widened in the manner described above by increasing the inter-circuit coupling, the decreasing of the stop-band attenuation can be compensated for by locating in the receive (Rx) or transmit (Tx) branch of the filter, or at a point after them, in parallel coupling, a surface wave filter coupled as a notch circuit, the centre frequency of the filter being suitably selected to be at the upper end of the stop band.

BRIEF DESCRIPTION OF THE DRAWINGS

The invention is described in greater detail with reference to the accompanying figures, in which.

DESCRIPTION OF THE PREFERRED EMBODIMENT

Figure 1:
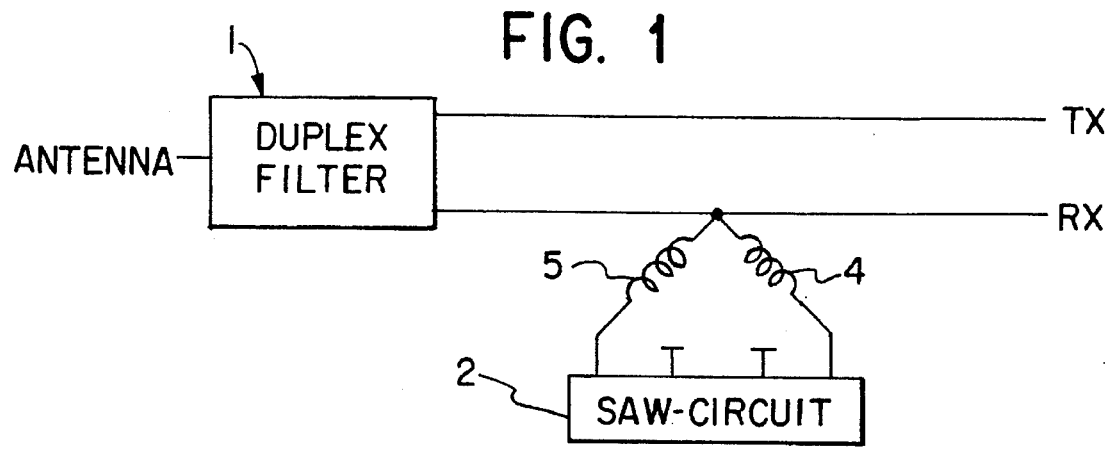
FIG. 1 is a block diagram of a surface acoustic wave circuit coupled to a branch of a duplex filter.

According to FIG. 1, the received signal travels from the antenna to the duplex filter 1, which has been constructed in some known manner, for example using helix resonators. As the now already complete duplex filter having certain pass bands and stop bands must be modified, by modifying the inter-resonator coupling, to bands wider than the original stop and pass bands, the stop-band attenuation decreases, as stated above. This is detrimental, especially when an Rx-branch stop band is concerned, i.e. when it is necessary to prevent the sensing of a transmitted signal Tx by the receiver, and the disadvantage is emphasized specifically at the stop band upper end, the steepness and attenuation of which are significantly reduced when the bands are widened in the prior-known manner. According to the first embodiment of the present invention, this is prevented by coupling, at a point immediately after the duplex filter, to a connection in its Rx branch, a surface wave circuit, which is implemented using a surface wave filter 2 as a narrow-band notch circuit. Surface wave components are in themselves band-pass type in character, but by using suitable circuitry, for example the one described in U.S. Pat. 4,694,266, a SAW notch filter can be implemented. A surface wave notch circuit is excellent for this purpose, since it has a high Q-value, an excellent temperature stability, small losses, and its notch frequency band can be made narrow. The notch filter 2 is a four-pole filter, two of its terminals being coupled to the circuit ground and the other two terminals via adapter inductances 4, 5 to the signal lead of the Rx branch. By means of the adapter inductances 4, 5, the impedance of the notch circuit is adjusted to 50 ohms. Due to its small size, the surface wave filter can be located physically either inside the duplexer casing 6 or, alternatively, outside it.

Above, an embodiment is described in which the notch circuit is coupled to the output of the Rx branch of the duplex filter. It can just as well be coupled to the output of the Tx branch, or to both branches, depending on the requirements which have been set on the stop bands. Likewise, it is clear that the notch circuit can itself be coupled to a suitable point in either branch. This is possible because of the small size of the notch circuit which uses a surface wave filter, the small size enabling, in all embodiments, the circuit to be physically located also inside the casing of the duplex filter, in which case the size and outer appearance of the filter remain exactly the same as those of the original.

Figure 2A:
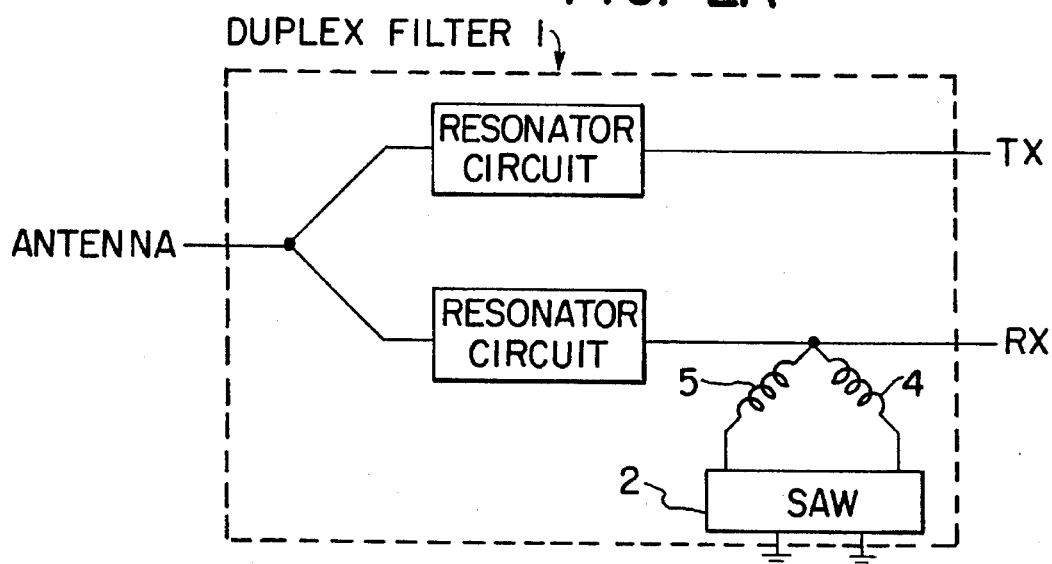
FIGS. 2A and 2B are block diagrams of a surface acoustic wave circuit within a duplex filter casing that employs resonator circuits.
Figure 2B:
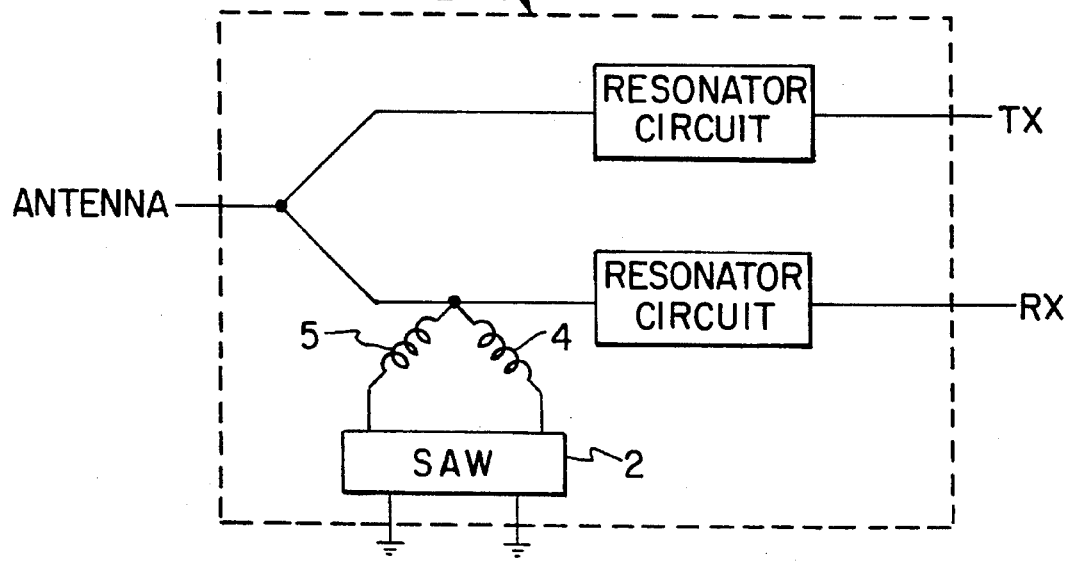

FIGS. 2A and 2B show further embodiments of the present invention in which a surface acoustic wave circuit is within the casing of a duplex filter having resonator circuits and is coupled to the Rx line either on the output side (FIG. 2A) or input side (FIG 2B) of one of the resonator circuits on the Rx line. As in the embodiment of FIG.1, the surface acoustic wave circuit includes the SAW notch filter 2 and adaptor inductors 4,5. The duplex filter 1 filters signals transmitting to the antenna via the transmit branch Tx and signals received from the antenna that travel via the receive branch Rx.

By the circuitry according to the invention, a significant improvement can be achieved, especially in the upper end of the stop band of a duplex filter, in which the attenuation in one measurement carried out improved by 18 dB as compared with circuitry without a notch filter, and thus the necessary widening of the pass band could be implemented without decreasing the pass band attenuation. A notch filter circuit implemented using a surface wave filter (SAW) can be implemented in many ways within the scope of knowledge of an expert in the art. In a number of embodiments of the invention it is desirable that it is sufficiently narrowband and that the Q-value is sufficiently high, at least 2-fold as compared with the corresponding helix resonator, but these requirements by no means limit its electric properties. By the method according to the invention, the size and construction of a duplex filter can remain unchanged.

I claim:

1. A circuit for increasing a stop band attenuation, comprising a duplex filter having a pass band, said duplex filter having a transmit branch connected between an antenna and a transmit branch connection, and a receive branch connected between said antenna and a receive branch connection, said transmit branch and said receive branch each including respectively at least one resonator circuit operatively coupled between the antenna and corresponding branch connection; and a surface acoustic wave device having two terminals connected together at one and the same location of one of said transmit and receive branches for affecting said surface acoustic wave device to operate as a notch filter.

2. A circuit for increasing a stop band attenuation, comprising a duplex filter having a pass band, said duplex filter having a transmit branch connected between an antenna and a transmit branch connection, and a receive branch connected between said antenna and a receive branch connection, said transmit branch and said receive branch each including respectively at least one resonator circuit operatively coupled between the antenna and corresponding branch connection; and a surface acoustic wave device having two terminals connected together at one and the same point location on one of said transmit and receive branches for affecting said surface acoustic wave device to operate as a notch filter.

3. A circuit as in claim 2, wherein each respective resonator circuit is modified so as to widen the pass band and decrease the stop band, and the notch filter operating to compensate for the decrease in the stop band attenuation due to the widening of the pass band.

4. A circuit as in claim 3, wherein a center frequency of the surface acoustic wave device is approximately equivalent to an upper end of the duplex filter stop band.

5. A circuit as in claim 3, wherein the surface acoustic wave device is a narrow band bandwidth filter.

6. A circuit as in claim 3, wherein the surface acoustic wave device is located within a duplex filter casing.

* * * * *

UNITED STATES PATENT AND TRADEMARK OFFICE
CERTIFICATE OF CORRECTION

PATENT NO. : 5,473,295
DATED : December 5, 1995
INVENTOR(S) : Aimo Turunen It is certified that error appears in the above-identified patent and that said Letters Patent is hereby corrected as shown below:

On the title page, item [63], and column 1, line 4,

> This is a continuation of PCT/FI91/00211, filed Jul. 4, 1991 --.

Signed and Sealed this

Twenty-sixth Day of March, 1996

Attest:

BRUCE LEHMAN

Attesting Officer     Commissioner of Patents and Trademarks